United States Patent [19]
Cyr et al.

[11] Patent Number: 6,099,930
[45] Date of Patent: Aug. 8, 2000

[54] METHODS FOR MARKING DIGITAL COMPACT DISCS AS A MEANS TO DETERMINE ITS AUTHENTICITY

[75] Inventors: Michael John Cyr; Horst Clauberg; Tony Wayne Helton; Gregory W. Nelson; Randy B. Meade; James E. Moore; G. Russell Owens; Barbara C. Jackson; James John Krutak, Sr., all of Kingsport, Tenn.

[73] Assignee: Isotag Technology, Inc., Houston, Tex.

[21] Appl. No.: 09/011,805
[22] PCT Filed: Dec. 15, 1997
[86] PCT No.: PCT/US97/23265
§ 371 Date: Jul. 20, 1998
§ 102(e) Date: Jul. 20, 1998
[87] PCT Pub. No.: WO98/29238
PCT Pub. Date: Jul. 9, 1998

Related U.S. Application Data
[60] Provisional application No. 60/034,421, Dec. 17, 1996.

[51] Int. Cl.[7] ............................................. B32B 3/00
[52] U.S. Cl. .................. 428/64.1; 428/64.2; 428/64.4; 428/64.8; 428/690; 428/913; 430/270.11; 430/495.1; 430/945; 369/283; 369/288
[58] Field of Search ................... 428/64.1, 64.2, 428/64.4, 64.8, 457, 690, 913; 430/270.11, 495.1, 945; 369/283, 288

[56] References Cited

U.S. PATENT DOCUMENTS

| | | | |
|---|---|---|---|
| 5,525,516 | 6/1996 | Krutak et al. | 436/56 |
| 5,553,714 | 9/1996 | Cushman et al. | 209/577 |
| 5,614,008 | 3/1997 | Escano et al. | 106/23 |
| 5,645,964 | 7/1997 | Nohr et al. | 430/21 |
| 5,665,151 | 11/1997 | Escano et al. | 106/31.15 |
| 5,703,229 | 12/1997 | Krutak et al. | 540/140 |

OTHER PUBLICATIONS

Patent Application—Serial No. 09/153742, Sep. 15, 1998, James John Krutak, Sr., et al, Cellulose Esters Naving Near–Infrafed Fluorophores and Method for Making Same.
Patent Application—Serial No. 60/087486, Jun. 01, 1998, Richard Dixon Neal et al, Fiber Coating Composition Having a Process Lubrican and an Invisible Marker.
Patent Application—Serial No. 60/087480, Jun. 01, 1998, Richard Dixon Neal et al, Fibers Coated with Marker Compositions and Cross–Linked Polymers.
Patent Application—Serial No. 08/981859, Nov. 05, 1997, Michael J. Cyr et al, Security Document and Method Using Invisible Coded Markings.
Patent Application—Serial No. 08/981805, Jan. 05, 1998, Nelson Z. Escano et al, Organic Solvent Based Ink for Invisible Marking Identification.
Patent Application—Serial No. 60/087429, Jun. 01, 1998 Richard Dixon Neal et al, Fiber Coating Composition Having an Invisible Marker and Process for Same.

*Primary Examiner*—Elizabeth Evans
*Attorney, Agent, or Firm*—Mark L Davis; John R Casperson

[57] ABSTRACT

A digital recording medium, such as a compact disc, having a substrate, a reflective layer and a protective layer includes a near infrared fluorophore in one of the layers. The near infrared fluorophore can be incorporated into the CD by coating, admixing, blending or copolymerization and in an amount to impart a detectable fluorescence from the fluorophore when exposed to electromagnetic radiation having a wavelength ranging from about 670 nanometers (nm) to about 1100 nm. A method of marking a CD with an invisible marking and an apparatus for detecting the fluorophore is further provided.

29 Claims, 1 Drawing Sheet

METHODS FOR MARKING DIGITAL COMPACT DISCS AS A MEANS TO DETERMINE ITS AUTHENTICITY

This application claims benefit of provisional application Ser. No. 60/034,421, filed Dec. 17, 1996.

BACKGROUND OF THE INVENTION

This invention relates to marking an article with an invisible marking for security or validation purposes and particularly, to marking a digital recording medium. More particularly, the invention relates to placing a marking on a compact disk (CD) using an invisible fluorescing compound. The invention also relates to a method of applying and detecting the fluorescing compound.

In the field of recording medium and recordings thereon, the recent use of digitally recorded information, such as pictures, sounds, software and the like using what is generally known as a compact disk or disc, has greatly improved the quality of the recording, the durability of the recording, and lowered the cost relative to prior magnetic storage tapes and disks. The production of the recorded information is accomplished by a process which, rather simplistically, may be described as an injected molded thermoplastic process. The recorded material on the CD is a series of data bits represented as pits and landings which are converted by the reading instrument, such as a CD player, to reproduce the recording. In one method of producing a CD, the information from the premastering data is recorded optically onto the surface of a glass master disk or substrate coated with a photoresist. From the glass master, a stamper is produced by depositing a nickel layer onto the glass master using an electroforming process. The stamper is then used to thermomold the CD in a replication process. Once thermoformed, the transparent CD is coated with an aluminum layer using a process known as metalizing. The CD is then coated with a protective lacquer to protect the reflective aluminum surface. The good CD is then mounted on a spindle. The whole process takes less than about 15 seconds. Using a screen printing process and methods known to those skilled in the art, the non-recorded surface of the CD can display graphics, art or other printed information. After printing, the CDS are automatically packaged into a hinged, clear plastic box, known as a jewel box, and wrapped in a clear plastic. The jewel box may contain further printed information on the inside or its cover.

Although the CD has revolutionized the recording industry, it is not without its problems. Because of the relative ease of manufacture, CD recordings can be readily counterfeited, depriving the recording artists, producers and distributors of income for their work. It is desirable in many commercial fields to provide a means by which an object may be identified as an original or authenticated or to prevent forgery or counterfeiting. In the past, previously used methods utilized ultraviolet inks or paints that fluoresce when subjected to an ultraviolet light source. Such markings produce a dramatic effect, since the markings, which originally seem invisible in visible or normal light, become visible when exposed to ultraviolet radiation. Examples of printing variable information such as bar codes with an ink jet printer utilizing the invisible markings are described in U.S. Pat. Nos. 5,423,432; 4,540,595; 5,093,147 and 4,983,817 the entire disclosures of which are incorporated herein by reference. However, the fundamental problem with such markings is that they can be easily located by a counterfeiter or product diverter. Moreover, such markings are highly susceptible to other fluorescent dyes and optical brighteners which are readily available on the market today.

U.S. Pat. No. 3,614,430 issued to Berler on Oct. 19, 1971 discloses a method for electronically retrieving coded information imprinted on a substantially translucent substrate. The ink used to code the information fluoresces when exposed to ultraviolet light. The fluorescence is photoelectrically sensed through the translucent substrate. A reader device then interprets the coded information and may further preform a desired output relative to the coded information.

U.S. Pat. No. 3,933,094 issued to Murphy et al. on Jan. 20, 1976 discloses a substrate such as, a business reply envelope, having bar code information imprinted thereon. The bar code is printed on the substrate using a plurality of inks having a color which, in combination with the substrate, yields a Print Contrast Signal substantially less than 50 percent when measured in the wavelength range of 800 to 900 nanometers. Added to the ink is a metallic compound sufficient to increase the Print Contrast Signal of the ink and substrate to at least 50 percent.

U.S. Pat. No. 4,504,084 issued to Miehe et al. on Nov. 12, 1991 discloses a method for marking originals so that copies can be distinguished from the originals. The method includes using a ribbon having a printing medium for printing the original. The ribbon includes a substance in the form of a marking which, when used, produces an invisible distinguishable marking which is recognizable only by using a special scanner.

U.S. Pat. 5,461,136 discloses polyesters having certain infrared fluorophores copolymerized therein to provide invisibly marked or tagged polymeric composition and a method of detection.

However, marking CDS or any of the packaging components has not been previously disclosed.

Accordingly, there is a need for a means by which a CD may be marked and identified as being an original.

SUMMARY OF THE INVENTION

Briefly, the present invention provides for a substantially flat, circular compact disc with a layered construction having a data medium layer, a reflective layer in contact with the data medium, a protective coating layer on at least one of the data medium layer or the reflective layer, preferably covering the reflective surface and more preferably covering both the data medium and reflective layer, and a near infrared fluorophore in or contacting one of the aforementioned layers. The near infrared fluorophore is present in a sufficient quantity to impart a detectable fluorescence when exposed to electromagnetic radiation having a wavelength ranging from about 670 nanometers (nm) to about 1100 nm.

It is another aspect of the invention to provide a method for marking a compact disc with a near infrared fluorophore. The method includes marking, blending, admixing or copolymerizing a near infrared fluorescing compound on or into one of layers of the CD during manufacture in a sufficient quantity to impart a detectable fluorescence when exposed to electromagnetic radiation having a wavelength ranging from about 670 nanometers (nm) to about 1100 nm.

Another aspect of the present invention is a method for detecting the presence of a fluorescing compound in a recording medium, and preferably a CD. The method includes providing a CD having a fluorescing compound present in a sufficient quantity to produce a fluorescence when exposed to an immediate source having a wavelength greater than 670 nm, exposing the CD to the same, and detecting the fluorescence. In a preferred embodiment, the fluorescing light is filtered to remove any reflected light from the excitation light source that may interfere with detection of the fluorescence wavelength.

It is an object of the invention to provide a digital data recording medium with an invisible marking for determining authenticity.

It is another object of the invention to provide a method of marking a digital data recording medium with a fluorescing compound.

It is another object of the invention to provide a method for detecting a fluorescence emitted from the fluorescing compound.

These and other objects and advantages of the invention will be better understood and appreciated from the following detailed description when taken in conjunction with the drawings wherein:

DETAILED DESCRIPTION OF THE PREFERRED EMBODIMENTS

Figure 1:
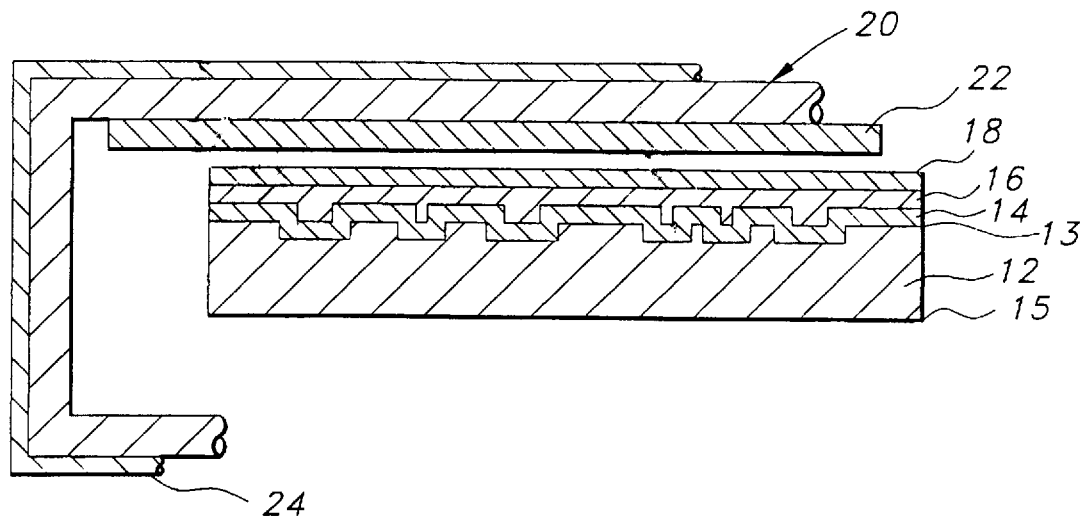
FIG. 1 is a cross-sectional view of a digital recording medium, illustrated as a compact disc (CD).

According to the present invention a digital data recording is provided having a near infrared fluorophore. Referring to FIG. 1, the data recording is illustrated as a compact disc or disk or CD 10 (used interchangeably herein). The CD 10 generally, has three basic layers: a base layer or substrate 12, a layer of highly reflective material 14 and a protective layer 16. The substrate 12 has two surfaces, a machine readable surface 13 and an oppositely disposed second surface 15. The readable surface 13 includes pits and landings to encode the digital data. The CD 10 may further include a graphics or art layer 18. The graphics 18 are helpful in assisting the user to identify the correct machine readable surface 13 of the CD 10.

The material forming the substrate layer 12 generally exhibits a good mechanical strength and a good structural integrity against warping. Suitable materials include glass, reinforced glass, ceramics, polymethacrylates, polyacrylates, polycarbonates, phenolic resins, epoxy resins, polyesters, polyimides, polyether sulfones, polyether ketones, polyolefins, polyphenylene sulfide and nylon. A preferred material for use as a substrate is a thermoplastic, desirably, polycarbonate having the near infrared fluorophore incorporated therein. The near infrared fluorophore composition can be copolymerized with the polycarbonate, admixed into the polycarbonate, or coated onto the surface of the polycarbonate. If the latter application methodology is chosen and the near infrared fluorophore is coated onto the substrate layer 12, it is preferable that the near infrared fluorophore be located adjacent to the second surface 15 of the substrate 12.

The near infrared fluorophore can be incorporated into the thermoplastic resin using conventional techniques such as those employed to incorporate other additives in such resins. For example, the near infrared fluorophores may be dry blended in the form of powders with the thermoplastic materials with or without adhesion promoter or a dispersing agent. This premix can be subsequently processed on extruders or molding machines. In some cases, solution blending may also be preferable. Of course, other conventional additives such as plasticizers, antioxidants, stabilizers, nucleating agents, etc. may also be present in the thermoplastic composition.

Furthermore, the shape and size of the substrate, and hence the recording medium, can vary depending upon the desired application. For example the shape may be a disk, tape, belt or drum. When the CD is formed by using a thermoplastic material it is advantageous to create the CD by injection molding. The substrate 12 may further include guiding grooves (not shown), in addition to the recorded data.

The substrate 12 is covered on at least one surface by a thin layer of highly reflective material 14. The reflective material 14 is desirably aluminum sputter coated onto the readable surface 13 of the substrate 12. If desired, the aluminum can be coated onto both surfaces of the substrate 12, but this is not preferred. Moreover, it is possible to laminate various under coating materials between the substrate 12 and the reflective material 14 such as thermosetting resins, electron beam cured resins and ultraviolet cured resins, although this is not preferred. As an alternative to incorporating the fluorophore into the substrate 12, the fluorophore can be coated onto at least one surface of the reflective layer 14, and preferably on the surface distal to the substrate 12.

The reflective layer 14 is very delicate and prone to abrasion and oxidation unless a protective coating 16 is applied thereto. The protective layer 16 can be any material that is compatible with the materials used in the construction of the CD and preferably is substantially transparent to the excitation radiation of the fluorophore. If a protective coating is further applied to the second surface 15 (not shown), it is desirable the layer not interfere with the data reading laser of the CD reader. Suitable materials for use as a protectant include polyurethanes, shellac, varnish, and preferably, lacquer. The lacquer is applied by a spin coating technique in which a concentric bead of lacquer is applied near the inner cut-out and spun at a controlled rate to uniformly cover the aluminized surface. After spin coating, the lacquer is cured to a hard, solid form by exposure to intense ultraviolet (UV) light (typically 1000 W) for 3–5 seconds.

The final preparation step before packaging the CD 10 is to apply a graphics or art layer 18. Desirably, the art layer 18 can be applied to the CD 10 using any method known in the art, such as, for example screen printing, gravure or intaglio printing techniques, but screen printing is preferred. Screen printing further allows relatively thick dried ink films to be printed on the CD from using high viscosity inks having a higher solids content. Typically, such ink films have a thickness of from about 15 to 60 microns and preferably from about 30–60 microns. This step is completed by curing the printed layer 18 with UV light (also typically 1000 W).

Since the near infrared fluorophore composition is invisible to the unaided human eye and desirably does not interfere with the laser used for reading of the data from the CD 10, the near infrared fluorophore composition can be incorporated into the substrate polymer or the material used to form the protective layer 16. Alternatively, one or more near infrared fluorophore composition(s) can be incorporated into or coated onto one or more of the CD surfaces, such as the substrate 12, the reflective layer 14, the protective layer 16, and/or the graphics layer 18. To aid in adding the fluorescing compound to an ink, the near infrared fluorophore can be dissolved or thinned using a suitable solvent such as dimethyl formamide, methyl ethyl ketones, methylcellosolve, ethanol, tetrahydrofuran, dichloromethane, and chlorobenze before adding the fluorophore to the ink base.

One skilled in the art will further recognize that a photomask or other symbology such as a logo or a bar code can also be used to transfer a unique graphic to the CD. This is accomplished by affixing to the surface of the spun coat lacquer layer 16, a sheet with the desired graphic or symbology blackened or UV protected. The CD and attached sheet are exposed to UV light so that the underlying lacquer/NIRF is photobleached in all areas which are not blackened or UV protected by the photo mask. It should be understood by those skilled in the art that reverse images may be made by protecting the surface of the CD except the desired graphic and that shading may be achieved by attenuating the UV light instead of complete blocking.

In another embodiment, the near infrared fluorophore may be incorporated into an ink used for printing a label with an art layer 18 that is then affixed to the CD.

A typical compact disc 10 for sale further includes a jewel box 20, one or more paper inserts 22, an over-wrap film 24, various types of affixed labels (special messages, advertising, tamper evident stickers, holograms, etc., not shown). It is within the scope of the present invention that each of these items can also be marked with a suitable invisible marking for the purpose of establishing authenticity. The invisible marking can be applied to the surface of each of these items by, for example, printing means using inks which contain the fluorophore(s) such as those described in U.S. Pat. Nos. 5,292,855, 5,336,714 and 5,423,432, the entire contents of each being incorporated herein by reference.

It is also within the scope of the invention to mark one or more of the above discussed layers and materials (12–24) with one or more near infrared fluorescing compounds which can be selected so that their respective absorbance and fluorescence are different enough from each other so as not to interfere with individual near infrared fluorophore compound detection. The near infrared fluorophore may further be overprinted using one or more other materials or inks, which may or may not be fluorescent, to build up a more complex design.

The near infrared fluorophore compound used in accordance with the invention should have excellent thermal stability and little light absorption in the visible region, i.e., they should impart little or no color to the thermoplastic polymer or lacquer to which the near infrared fluorophore is copolymerized or admixed. The near infrared fluorophores should have a strong absorption of near infrared light and have strong fluorescence in the near infrared over the wavelengths of about 670–1100 nm. Suitable stability to sunlight and fluorescent light and low extractability or sublimation from the thermoplastic or lacquer is preferred.

Suitable invisible marking compositions include near infrared fluorophores such as those disclosed in U.S. Pat. Nos. 5,461,136 and 5,423,432, the disclosures of which are incorporated herein by reference. Generally those compositions which have their major absorbance peak at wavelengths above about 600 nm and preferably between about 650 and 1100 nm. However, compounds which fluoresce at wavelengths beyond the near infrared may also be suitable. Suitable near infrared fluorophores should be invisible to the eye at the concentrations at which they are used, but still display sufficient fluorescence to allow accurate detection. The near infrared fluorophores must also retain their fluorescence after incorporation into the CD or application to the CD packaging. The preferred near infrared fluorescent compounds are selected from phthalocyanines, naphthalocyanines and squaraines corresponding to Formulae I, II and III:

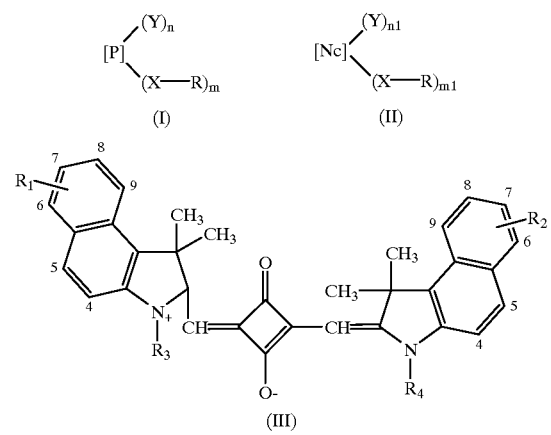

wherein Pc and Nc represent the phthalocyanine and naphthalocyanine moieties of Formulae Ia and IIa,

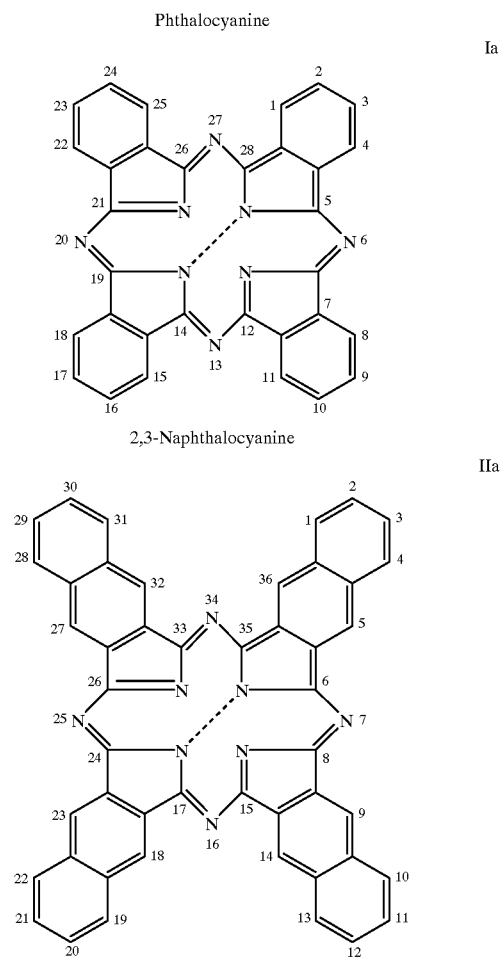

respectively, covalently bonded to hydrogen or to various metals, halometals, organometallic groups, and oxymetals including AlCl, AlBr, AlF, AlOH, $AlOR_5$, $AlSR_5$, Ca, Ge, $Ge(OR_6)$, Ga, InCl, Mg, Pb, $SiCl_2$, $SiF_2$, $SnCl_2$, $Sn(OR_6)_2$, SN(SR$_6$), Si(SR$_6$)$_2$, TiO, or Zn, wherein R$_5$ and R$_6$ are selected from hydrogen, alkyl, aryl, heteroalyl, lower alkanoyl, trifluoroacetyl, groups of the formulae:

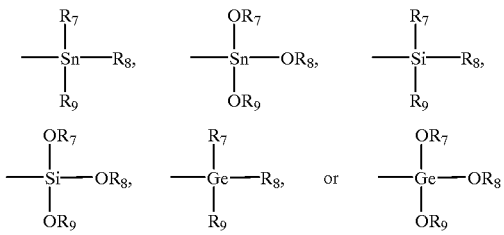

R$_7$, R$_8$ and R$_9$ are independently selected from alkyl, phenyl or phenyl substituted with lower alkyl, lower alkoxy or halogen.

X is selected from oxygen, sulfur, selenium, tellurium or a group of the formula N(R$_{10}$), wherein R$_{10}$ is hydrogen, cycloalkyl, alkyl, acyl, alkylsulfonyl, or aryl or R$_{10}$ and R taken together form an aliphatic or aromatic ring with the nitrogen atom to which they are attached.

Y is selected from alkyl, halogen or hydrogen.

R is selected from unsubstituted or substituted alkyl, alkenyl, alkynyl, C$_3$-C$_8$ cycloalkyl, aryl, heteroaryl,

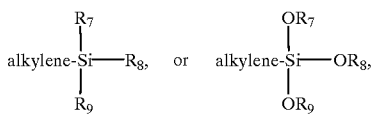

(X—R) moiety is alkylsulfonylamino, arylsulfonylamino, or a group selected from the formulae —X(C$_2$H$_4$O)$_2$R$^1$,

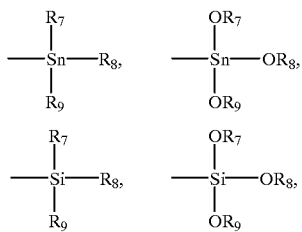

wherein R$^1$ is hydrogen or R as defined above; z is an integer of from 1–4.

Further two (X—R) moieties can be taken together to form divalent substituents of the formula:

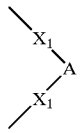

wherein each X$_1$ is independently selected from —O—, —S—, or —N(R$_{10}$) and A is selected from ethylene; propylene; trimethylene; and such groups substituted with C$_1$-C$_4$ alkyl, C$_1$-C$_4$ alkoxy, aryl and cycloalkyl; 1,2-phenylene and 1,2-phenylene containing 1–3 substituents selected from C$_1$-C$_4$ alkyl, C$_1$-C$_4$ alkoxy or halogen.

R$_1$ and R$_2$ are independently selected from hydrogen, lower alkyl, lower alkoxy, halogen, aryloxy, lower alkylthio, arylthio, lower alkylsulfonyl; arylsulfonyl; lower alkylsulfonylamino, arylsulfonylamino, cycloalkylsulfonylamino, carboxy, unsubstituted and substituted carbamoyl and sulfamoyl, lower alkoxycarbonyl, hydroxy, lower alkanoyloxy,

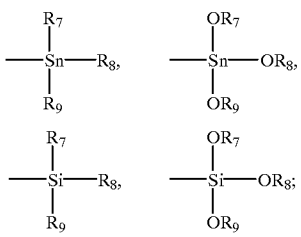

R$_3$ and R$_4$ are independently selected from hydrogen, lower alkyl, alkenyl or aryl; n and m can be an integer from 0–16, and n$_1$ and m$_1$ can be an integer from 0–24 provided that the sums of n+m and n$_1$-m$_1$ are 16 and 24, respectively. It is to be understood that when n, m, n$_1$ and m$_1$ is 0 the respective moiety is absent.

In a preferred embodiment of this aspect of the present invention m is from 4 to 12; m$_1$ is from 0–8; provided that in the definitions of the substituents (Y)n, (Y)n$_1$ and (X—R) m$_1$ that these substituents are not present when n, n, and m$_1$ are zero, respectively. Substituents (X—R) and (Y) are present in compounds Ia on the peripheral carbon atoms, i.e., in positions 1, 2, 3, 4, 8, 9, 10, 11, 15, 16, 17, 18, 22, 23, 24, 25 and substituents (X—R) and (Y) are present on the peripheral carbon atoms of IIa, i.e., in positions 1, 2, 3, 4, 5, 9, 10, 11, 12, 13, 14, 18, 19, 20, 21, 22, 23, 27, 28, 29, 30, 31, 32 and 36.

In the above definitions, the term alkyl is used to designate a straight or branched chained hydrocarbon radical containing 1–12 carbons.

In the terms lower alkyl, lower alkoxy, lower alkylthio, lower alkoxycarbonyl, lower alkanoyl and lower alkanoyloxy the alkyl portion of the groups contains 1–6 carbons and may contain a straight or branched chain.

The term "cycloalkyl" is used to represent a cyclic aliphatic hydrocarbon radical containing 3–8 carbons, preferably 5 to 7 carbons.

The alkyl and lower alkyl portions of the previously defined groups may contain as further substituents one or more groups selected from hydroxy, halogen, carboxy, cyano, C$_1$-C$_4$-alkoxy, aryl, C$_1$-C$_4$-alkylthio, arylthio, aryloxy, C$_1$-C$_4$-alkoxycarbonyl or C$_1$-C$_4$-alkanoyloxy.

The term "aryl" includes carbocyclic aromatic radicals containing 6–18 carbons, preferably phenyl and naphthyl, and such radicals substituted with one or more substituents selected from lower alkyl, lower alkoxy, halogen, lower alkylthio, N(lower alkyl)$_2$, trifluromethyl, carboxy, lower alkoxycarbonyl, hydroxy, lower alkanoylamino, lower allkylsulfonylamino, arylsulfonylamino, cycloalkylsulfonylamino, lower alkanoyloxy, cyano, phenyl, phenylthio and phenoxy.

The term "heteroaryl" is used to represent mono or bicyclic hetero aromatic radicals containing at least one "hetero" atom selected from oxygen, sulfur and nitrogen or a combination of these atoms. Examples of suitable heteroaryl groups include: thiazolyl, benzothiazolyl, pyrazolyl, pyrrolyl, thienyl, furyl, thiadiazolyl, oxadiazolyl, benzoxazolyl, benzimidazolyl, pyridyl, pyrimidinyl and triazolyl. These heteroaryl radicals may contain the same substituents listed above as possible substituents for the aryl radicals. The term triazolyl also includes structure IV and mixed isomers thereof,

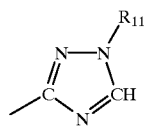

IV wherein $R_{11}$ is hydrogen or selected from lower alkyl and lower alkyl substituted with one or two groups selected from hydroxy, halogen, carboxy, lower alkoxy, aryl, cyano, cycloalkyl, lower alkanoyloxy or lower alkoxycarbonyl.

The terms "alkenyl and alkynyl" are used to denote aliphatic hydrocarbon moiety having 3–8 carbons and containing at least one carbon-carbon double bond and one carbon—carbon triple bond, respectively.

The term halogen is used to include bromine, chlorine, fluorine and iodine.

The term "substituted alkyl" is used to denote a straight or branched chain hydrocarbon radical containing 1–12 carbon atoms and containing as substituents 1 or 2 groups selected from hydroxy, halogen, carboxy, cyano, $C_1$–$C_4$ alkoxy, aryl, $C_1$–$C_4$ alkylthio, arylthio, aryloxy, $C_1$–$C_4$ alkoxycarbonyl, or $C_1$–$C_4$ alkanoyloxy.

The term "substituted carbamoyl" is used to denote a radical having the formula—$CONR_{12}R_3$, wherein $R_{12}$ and $R_{13}$ are selected from unsubstituted or substituted alkyl, alkenyl, alkynyl, cycloalkyl, aryl, or heteroaryl.

The term "substituted sulfamoyl" is used to denote a radical having the formula—$SO_2NR_{12}R_{13}$, wherein $R_{12}$ and $R_{13}$ are as defined above.

The term "alkylene" refers to a divalent $C_1$–$C_{12}$ aliphatic hydrocarbon moiety, either straight or branched-chain, and either unsubstituted or substituted with one or more groups selected from lower alkoxy, halogen, aryl, or aryloxy.

The term "acyl" refers to a group of the formula $R°C(O)$—$O$—, wherein $R°$ is preferably a $C_1$–$C_{10}$ alkyl moiety. The term "alkyl sulfonyl" refers to a group of the formula $R°SO_2$—, wherein $R°$ is as defined for acyl.

Another embodiment of the invention is a method for marking a compact disk 10 as described above with a near infrared fluorophore. The method comprising adding a near infrared fluorescing compound to one of the layers of the compact disc 10 in a sufficient quantity to impart a detectable fluorescence when exposed to electromagnetic radiation having a wavelength ranging from about 670 nanometers (nm) to about 1100 nm. Normally, suitable fluorescence efficiency is obtained when the amount of near infrared fluorophore is present in the amount of from about 0.5 ppm to about 5000 ppm, preferably from about 1 ppm to about 2000 ppm, more preferably from about 10 ppm to about 600 ppm.

Depending on the type of mark present, the authenticity of the CD can be verified by detection of the near infrared fluorophore using a suitably designed detector. For example, simple yes/no detection of a near infrared fluorophore which is incorporated into plastic (such as the jewel box or shrink wrap used in CD packaging) is described by U.S. Pat. Nos. 5,397,819. More complex, "intelligent" mark (i.e., a bar code) detection is described by U.S. Pat. No. 4,983,817. The entire disclosure of each being incorporated herein by reference.

Figure 2:
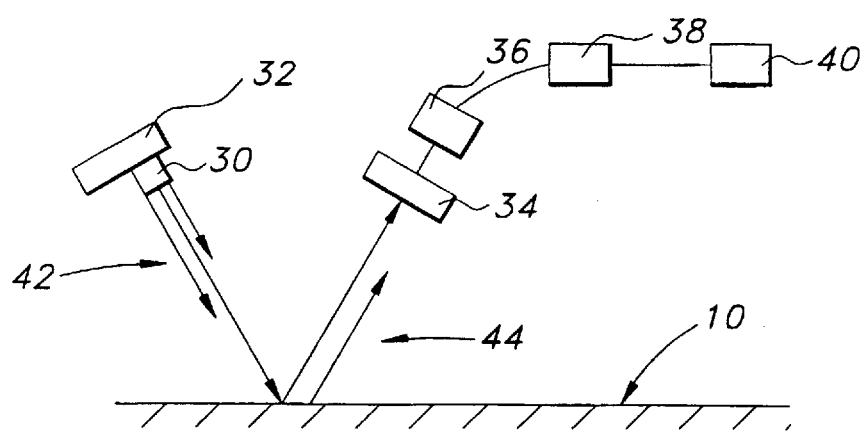
FIG. 2 depicts an apparatus that is useful in practicing the present invention for the detection and imaging of the near infrared fluorescing marker contained in or on the CD.

Alternatively, near infrared fluorescent alphanumeric information or graphics (including 2-dimensional bar code symbologies) can be imaged with a device as shown in FIG. 2. This device includes an illumination source 30, a heat sink or temperature control means 32, an optical filter 34, an electronic camera (i.e., a charge-coupled device (CCD), charge-injection device (CID)) 36, image recognition/processing hardware/software (e.g. optical character recognition or OCR) 38, and visualization means 40 (i.e., television, video monitor, LCD display, etc.). As described herein, this device is generally a small or hand-held instrument that can be positioned on or over an object to generate an image resulting from the near infrared fluorescence pattern, if any, activated by the illumination source.

Due to the low noise characteristics of the near infrared region exhibited by many materials, i.e., weak absorbance/fluorescence, the detectors of the present invention can detect the fluorescence of the near infrared fluorophore whether or not the detector is in direct contact with the object. For example, the detector can detect the presence of the near infrared fluorophore printed on the surface of the object that is directly in contact with the detector (such as the exterior shrink wrap coating) or the presence of the near infrared fluorophore printed on the surface of an object not directly in contact with the detector, i.e., the CD packaged within the jewel box. In addition, the detector can detect the near infrared fluorophore that is an integral part of the material of construction of the object, i.e., near infrared fluorophore which have been incorporated into the overwrap film, plastic label, jewel box, CD polycarbonate layer, lacquer coating or silkscreen inks.

In one embodiment of this invention, the illumination source 30 is a laser diode, such as a P460-ND laser diode from Digi-Key. However, the illumination source can include other types of optical sources, such as a light emitting diode (LED) or a suitably filtered broad-spectrum light, without departing from the spirit and scope of the present invention. The heat sink device 32 is a large mass which serves as a holder for the diode. Alternatively, this component can be a Pelletier-type device for maintaining a constant temperature of the laser diode to control the wavelength output near the optimal position for maximal fluorescence activation, i.e., the maximal absorption band of the near infrared fluorophore.

The optical filter 34 is typically a colored-glass filter or a doublet of colored-glass filters (such as one or more Corion LG-750 cut-on, long-pass colored glass filters), or an interference filter for selectively passing at least some of the wavelengths of light emitted by the particular near infrared fluorophore or specific mixture of near infrared filters (Corion S10-730-F interference filter). The CCD camera 36 is a V-1055 from Marshall Electronics, Culver City, Calif. Alternatively, an interference filter coating may be applied directly to the CCD or CID chip as a means to negate the need for the separate filter 34. The visualization means 40 can be a television or video monitor which can operate off of the video signal generated by the camera such as a television.

To determine the authenticity of a CD, detection of the presence of the near infrared fluorophore is needed. The illumination source 30 provides excitation light 42 that impinges upon or penetrates the CD. As known to those skilled in the art, each near infrared fluorophore is excited by light (excitation light) having a predetermined wavelength or having a wavelength within a predetermined range of wavelengths. Thus, the illumination source preferably provides excitation light having a wavelength selected to excite the particular near infrared fluorophore of interest, i.e., to be within the maximal absorption band of the particular NIRF.

Once excited, the near infrared fluorophore emits light 44 at a longer wavelength than the respective wavelength of the excitation light 42. As shown in FIG. 2, at least some of the fluorescent light 44 and a portion of the excitation light 42 reflected by the object and is directed towards the optical filter 34 and camera 36. Although not shown in FIG. 2, the camera 36 can have one or more lenses for focusing the image upon the detector array elements. Additionally, the optical path may include fiber optics to transmit the fluorescent light from a remote location to the camera 36. The optical filter 34 permits only those wavelengths associated with the fluorescent light to pass and be detected by the camera 36. The camera 36 then produces an electric signal suitable to generate an image directly on the viewing means 40.

The image recognition/processing hardware or software 38 can include optical character recognition device, a 2-D bar code decoder and the like. Such devices and software are well known to those skilled in the scanner art.

In addition to the already discussed applications, a device such as the one pictured in FIG. 2 and described earlier can be used to verify the quality and accuracy of intelligent markings (i.e., bar codes, 2-D symbology, etc.) made with near infrared fluorophore containing inks. Devices that perform this function for black and white bar-codes are generally known as verifiers. For example, a device such as the one in FIG. 2 with the appropriate image processing electronics/software could verify that the intensity, contrast and/or edge-definition of an invisible NIRF bar-code met a set of predetermined standards.

EXAMPLE

A copolymerized phthalocyanine and copolymerized naphthalocynine compound were mixed into CD lacquer to a concentration of 100 ppm. The near infrared fluorophore/lacquer composition was spun coated onto a CD and cured using ultraviolet light. Graphics were applied on top of the lacquer coating via silkscreening and again cured using ultraviolet light.

The CDS were imaged with an image detection device and checked with a CCD camera detector. An unmarked CD showed no discernible image and appeared black on the viewer. The CDS containing the near infrared fluorophore compound in the lacquer coat showed an image defined by the graphics applied. The image appeared as if "backlit," (i.e., the image generated looked as if the light was coming from behind the CD toward the camera). Thus, invisibly marked CDS according to the present invention are distinguishable from non-marked CDS.

One skilled in the art will understand that various modifications can be made to the present invention without departing from the teachings hereof. It is to be further understood that the details, materials and arrangement of the parts of the specific embodiments have been described and illustrated to explain the nature of the invention herein are not intended to limit the claims which define the scope of the invention. Changes may be made by those skilled in the art without departing from spirt and scope of the invention as expressed in the appended claims.

We claim:

1. A digital recording comprising a recording medium or substrate layer, a reflective layer adjacent to said substrate layer, a protective coating layer adjacent to said reflective layer, and a sufficient amount of a near infrared fluorophore incorporated on or into one of said layers to impart a detectable fluorescence from said fluorophore when exposed to electromagnetic radiation having a wavelength ranging from about 670 nanometers (nm) to about 1100 nm.

2. The digital recording of claim 1 wherein said recording medium is selected from the group consisting of glass, reinforced glass, ceramics, polymethacrylates, polyaclylates, polycarbonates, phenolic resins, epoxy resins, polyesters, polyimides, polyether sulfones, polyether ketones, polyolefins, polyphenylene sulfide and nylon.

3. The digital recording of claim 2 wherein said recording medium is a thermoplastic material.

4. The digital recording of claim 3 wherein said recording medium is polycarbonate.

5. The digital recording of claim 1 wherein said fluorophore is present in said substrate layer.

6. The digital recording of claim 3 wherein said fluorophore is copolymerized with said thermoplastic material.

7. The digital recording of claim 1 wherein said recording is a compact disc.

8. The digital recording of claim 1 wherein said fluorophore is imprinted on a surface of at least one of said layers.

9. The digital recording of claim 1 wherein said amount of said fluorophore is from about 0.5 ppm to about 5000 ppm.

10. The digital recording of claim 1 wherein said protective layer is selected from the group consisting of polyurethane, shellac, varnish, lacquer and combinations thereof.

11. The digital recording of claim 10 wherein said fluorophore is admixed with said protective layer.

12. A compact disc comprising a recording medium or substrate layer, a reflective layer adjacent to said substrate layer, a protective cover layer adjacent to said reflective layer and a sufficient amount of a near infrared fluorophore incorporated on or into one of said layers to impart a detectable fluorescence from said fluorophore when exposed to electromagnetic radiation having a wavelength ranging from about 670 nanometers (nm) to about 2500 nm.

13. The compact disc of claim 12 wherein said recording medium is selected from the group consisting of glass, reinforced glass, ceramics, polymethacrylates, polyacrylates, polycarbonates, phenolic resins, epoxy resins, polyesters, polyimides, polyether sulfones, polyether ketones, polyolefins, polyphenylene sulfide and nylon.

14. The compact disc of claim 13 wherein said recording medium polycarbonate.

15. The compact disc of claim 12 wherein said protective layer is selected from the group consisting of polyurethane, shellac, varnish, lacquer and combinations thereof.

16. The compact disc of claim 12 wherein said fluorophore is admixed with said protective coating layer.

17. The compact disc of claim 12 wherein said amount of fluorophore is from about 1 ppm to about 2000 ppm.

18. The compact disc of claim 12 wherein said amount of fluorophore is from about 10 ppm to about 600 ppm.

19. A method for marking a compact disk with a near infrared fluorophore, the compact disc having a recording medium or substrate layer, a reflective layer adjacent to said substrate layer and a protective cover layer adjacent to said reflective layer, said method comprising adding a near infrared fluorescing compound to one of said layers of the compact disc in a sufficient quantity to impair a detectable fluorescence when exposed to electromagnetic radiation having a wavelength ranging from about 670 nanometers (nm) to about 1100 nm.

20. The method of claim 19 wherein said substrate includes said near infrared fluorescing compound.

21. The method of claim 19 wherein said protective layer includes said near infrared fluorescing compound.

22. The method of claim 19 wherein said fluorophore is imprinted on a surface of at least one of said layers.

23. The compact disc of claim 19 further includes a label and said label includes said fluorescing compound.

24. The method of claim 23 wherein said label is printed on one surface of the compact disc using a silk-screen printing method.

25. An apparatus for detection of an invisible fluorescing marking composition incorporated into or on a digital recording medium, such as a compact disc, said apparatus comprising a light receiving means having a lens and an optical filter positioned to filter non-specific wavelengths from the field of view of said lens.

26. The apparatus of claim 25 wherein said light receiving means is a CCD camera.

27. The apparatus of claim 26 wherein said filter selectively passes at least a portion of light having a wavelength substantially equal to said fluorescence.

28. The apparatus of claim 25 further comprising a mean for excitation of said fluorophore to produce a fluorescence.

29. The apparatus of claim 25 further comprising a visualization means which can operate from a video signal from said light receiving means.

* * * * *